United States Patent
Remans et al.

(10) Patent No.: US 9,566,570 B2
(45) Date of Patent: Feb. 14, 2017

(54) PROCESS FOR CATALYST UNLOADING FACILITATION

(71) Applicant: SHELL OIL COMPANY, Houston, TX (US)

(72) Inventors: Thomas Joris Remans, Amsterdam (NL); Gerrit Leendert Bezemer, Amsterdam (NL); Franciscus Johannes Maria Schrauwen, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/034,882

(22) PCT Filed: Nov. 4, 2014

(86) PCT No.: PCT/EP2014/073642
§ 371 (c)(1),
(2) Date: May 6, 2016

(87) PCT Pub. No.: WO2015/067587
PCT Pub. Date: May 14, 2015

(65) Prior Publication Data
US 2016/0271592 A1    Sep. 22, 2016

(30) Foreign Application Priority Data

Nov. 8, 2013  (EP) .................................... 13192192

(51) Int. Cl.

| | | |
|---|---|---|
| *C01B 31/08* | (2006.01) | |
| *B01J 23/75* | (2006.01) | |
| *B01J 8/00* | (2006.01) | |
| *C10G 2/00* | (2006.01) | |
| *B01J 21/06* | (2006.01) | |
| *B01J 23/89* | (2006.01) | |
| *B01J 35/02* | (2006.01) | |
| *B01J 37/06* | (2006.01) | |
| *B01J 37/14* | (2006.01) | |

(52) U.S. Cl.
CPC .............. *B01J 23/75* (2013.01); *B01J 8/0015* (2013.01); *B01J 21/063* (2013.01); *B01J 23/8913* (2013.01); *B01J 35/026* (2013.01); *B01J 37/06* (2013.01); *B01J 37/14* (2013.01); *C10G 2/33* (2013.01); *C10G 2/332* (2013.01); *C10G 2/341* (2013.01); *B01J 2208/00761* (2013.01); *C10G 2300/4056* (2013.01); *C10G 2300/70* (2013.01); *C10G 2300/708* (2013.01)

(58) Field of Classification Search
CPC .............................. C01B 31/088; C01B 31/08
USPC ......................................................... 502/56
See application file for complete search history.

(56) References Cited

U.S. PATENT DOCUMENTS

| | | |
|---|---|---|
| 4,595,703 A | 6/1986 | Payne et al. |
| 8,431,507 B2 | 4/2013 | Bezemer et al. |
| 8,729,140 B2 | 5/2014 | Bezemer et al. |
| 2004/0192989 A1 | 9/2004 | Espinoza et al. |

FOREIGN PATENT DOCUMENTS

WO    9700231    1/1997

*Primary Examiner* — Edward Johnson

(57) ABSTRACT

A process for facilitating the unloading of a fixed bed of cobalt/metal oxide catalyst particles from a reactor tube by (i) feeding a gas comprising 10 to 30 (vol/vol) percent of oxygen to the reactor tube with a GHSV for oxygen of 0.5 to 50 Nl/l/hr, and (ii) removing the catalyst particles from the reactor tube. In the fixed bed of catalyst particles to which the oxygen comprising gas is fed in step (i) at most 10 mole % of the element cobalt is present in $Co_3O_4$ and/or CoO, calculated on the total amount of moles of cobalt in the catalyst particles.

15 Claims, No Drawings

PROCESS FOR CATALYST UNLOADING FACILITATION

PRIORITY CLAIM

The present application is a National Stage (§371) application of PCT/EP2014/073642, filed Nov. 4, 2014, which claims priority from European Patent Application 13192192.6 filed Nov. 8, 2013, each of which are hereby incorporated by reference in their entirety.

The present invention relates to a process for facilitating the unloading of a fixed bed of catalyst particles from a reactor tube. The process is especially suitable for unloading a fixed bed of catalyst particles which comprise a metal oxide and cobalt.

The catalyst to be unloaded may be suitable for use in producing normally gaseous, normally liquid and optionally solid hydrocarbons from synthesis gas generally provided from a hydrocarbonaceous feed, for example a Fischer Tropsch process.

The catalyst may have swollen during use, for example during a Fischer Tropsch process. The current process facilitates the unloading of a fixed bed of catalyst particles, especially when the bed comprises catalyst particles with a larger size than before use.

The Fischer Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into paraffinic compounds and water. The obtained paraffinic compounds range from methane to high molecular weight modules. The obtained high molecular weight modules can comprise up to 200 carbon atoms, or, under particular circumstances, even more carbon atoms.

Numerous types of reactor systems have been developed for carrying out the Fischer Tropsch reaction. For example, Fischer Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebulated bed reactors.

Catalysts used in the Fischer Tropsch synthesis often comprise a carrier based support material and one or more metals from Group 8-10 of the Periodic Table, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

One of the limitations of using a catalyst is that the activity of the catalyst will, due to a number of factors, decreases over time. A catalyst that shows a decreased activity after use is sometimes referred to as deactivated catalyst, even though it usually still shows some activity. Sometimes such a catalyst is referred to as a deteriorated catalyst. Sometimes it is possible to regenerate the catalyst. This may be performed, for example, with one or more oxidation and/or reduction steps.

When it is time to replace a used catalyst, the catalyst needs to be unloaded from the reactor tube. The current process facilitates the unloading of a fixed bed of catalyst particles from a reactor tube. The current process is especially advantageous when the bed comprises catalyst particles with a larger size than before use, but also when the catalyst particles did not or hardly swell during use, the present process reduces the time needed for unloading significantly.

According to one aspect of the present invention, there is provided a process for facilitating the unloading of a fixed bed of catalyst particles from a reactor tube,
the catalyst particles comprising:
at least 40 weight % of a metal oxide chosen from the group of titania, silica, alumina, zirconia, ceria, gallia and mixtures thereof and
at least 2 weight % of the element cobalt, calculated on the total weight of the catalyst particles;
the process comprising the steps of:
(i) feeding a gas comprising 10 to 30 (vol/vol) percent of oxygen, preferably 15 to 25 (vol/vol) percent of oxygen, to the reactor tube with a gas hourly space velocity for oxygen of 0.5 to 50 Nl/l/hr; and
(ii) removing the catalyst particles from the reactor tube; wherein in the fixed bed of catalyst particles to which the oxygen comprising gas is fed in step (i) at most 10 mole %, preferably at most 5 mole %, more preferably at most 1 mole %, even more preferably at most 0.1 mole %, of the element cobalt is present in $Co_3O_4$ and/or $CoO$, calculated on the total amount of moles of cobalt in the catalyst particles.

The process steps are performed in the order of numbering.

The catalyst particles in the reactor tube preferably have a particle size of at least 1 mm before the oxygen comprising gas is fed to the reactor tube in step (i). Particles having a particle size of at least 1 mm are defined as particles having a longest internal straight length of at least 1 mm.

Preferably at least 60 wt %, more preferably at least 70 wt %, even more preferably at least 80 wt %, of the catalyst particles in the fixed bed consists of particles with a size of at least 1 mm, more preferably at least 1.5 mm, even more preferably at least 2 mm, most preferably at least 3 mm. Preferably at least 80 wt %, more preferably at least 99 wt % of the catalyst particles in the fixed bed has a size of 6 mm or smaller, more preferably 5 mm or smaller.

With the process according to the present invention, a part of the deactivated cobalt and metal oxide comprising catalyst particles can be made to shrink significantly. Especially catalyst particles in the centre of the reactor tube, anywhere along the length of the reactor tube, can be made to shrink significantly. With the process of the invention at least a part of any swollen catalyst particles along the axis of the catalyst bed in the reactor tube can be made to shrink significantly.

One may perform the process of the present invention on a single reactor tube comprising a fixed bed of catalyst particles, for example Fischer Tropsch catalyst particles. Alternatively, more than one reactor tube, each comprising a fixed bed of catalyst particles, for example Fischer Tropsch catalyst particles, may be subjected to the process at the same time.

One advantage of performing the process of the present invention is that it facilitates the unloading of the catalyst particles from the reactor tube. In case swollen catalyst particles are present in the reactor tube, especially in the centre of the reactor tube, anywhere along the length of the reactor tube, at least a part of these catalyst particles can be made to shrink. This will make it easier to remove the catalyst bed from the reactor tube.

The temperature of the oxidation of step (i) may be controlled, among others, by controlling the oxygen concentration, the flow rate, and the temperature of the oxygen comprising gas at the inlet of the reactor tube.

During the process of the current invention, the oxidation step is preferably performed in the absence of water. Some water (or steam) may be present, but preferably less than 1 vol % of the gas passing the particles consists of water, more preferably less than 0.1 vol %, even more preferably less than 0.01 vol %, most preferably less than 0.001 vol %.

During step (i) of the process of the current invention, metallic cobalt present in the deactivated catalyst particles is reacted to form cobalt oxide, such as CoO and $Co_3O_4$.

During step (i) of the process of the current invention, the oxygen comprising gas fed to the reactor preferably has a temperature in the range of between 0 and 300° C., preferably between 20 and 200° C., more preferably between 20 and 100° C. After being fed to the reactor, the temperature of the oxygen comprising gas may change. For example, the temperature of the gas may change due to the reactor temperature. Additionally, the temperature of the gas will increase due to the reaction of oxygen with the metallic cobalt on the deactivated catalyst particles. Further, the temperature of the gas may increase when oxygen reacts with any leftover carbon on the catalyst particles.

During step (i) of the process of the current invention, the oxygen comprising gas preferably is air.

The total pressure in the reactor tube during step (i) is in the range of 1 to 10 bar absolute, preferably 1 to 5 bar absolute.

In step (i) a gas comprising 10 to 30 (vol/vol) percent of oxygen, preferably 15 to 25 (vol/vol) percent of oxygen, is fed to the reactor tube with a gas hourly space velocity for oxygen of 0.5 to 50 Nl/l/hr. Preferably the gas hourly space velocity of oxygen is 1 to 20 Nl/l/hr, preferably 2 to 10 Nl/l/hr.

Step (i) of the process preferably is performed as follows. An oxygen comprising gas flows through the reactor tube, while cooling the reactor tube from the outside. The temperature of the reactor tube at the cooling side preferably is in the range of between 50 and 400° C., preferably between 100 and 300° C.

The oxygen comprising gas may be fed in step (i) to the top of the reactor tube, to the bottom of the reactor, or to a place along the reactor tube. The gas may flow upwards or downwards when the reactor stands, or sideways when the reactor is placed horizontally. Obviously, when the gas flows through the reactor tube, it also flows through the fixed bed of catalyst particles.

Preferably step (i) is performed in a once through operation. Preferably step (i) is performed by feeding the oxygen or the oxygen comprising gas from the top to the bottom of the reactor tube, or from the bottom to the top of the reactor tube.

The cooling may be performed using any cooling medium, for example water and/or steam. By performing the process in this way, sensitive parts of the reactor can be protected from becoming too warm for a too long period of time. The relatively small area in the tube where most of the oxidation takes place, i.e. at the reaction front, moves from the inlet of the gas towards the outlet. The temperature of this front can be controlled by controlling the gas inlet temperature, and/or the concentration of oxygen in the gas at the inlet, and/or the space velocity of the oxygen comprising gas, and/or the cooling at the outside of the tubes.

The reactor tube in which the fixed bed of catalyst particles is present preferably comprises steel, carbon steel and/or stainless steel.

During step (i) the reaction front which moves through the fixed bed of catalyst particles shows a temperature gradient. In the centre, which is along the axis of the reactor tube, the temperature will be higher than closer to the cooling side of the reactor tube. In the centre of the reaction front the temperature preferably is at least 300° C., more preferably at least 600° C., even more preferably at least 680° C., still more preferably at least 750° C. In the centre of the reaction front the temperature may be well over 1200° C. In the centre of the reaction front the temperature preferably is less than 1500° C. During step (i) at least a part of any swollen catalyst particles along the axis of the reactor tube will shrink due the subjection to a high temperature. The temperature in the core of the tube can be directly measured with thermocouples. This can be done by a series of thin thermocouples that are combined and aligned in the centre of the tube.

When the reaction front moves through the reactor, the temperature of the reactor as a whole will hardly change. The temperature of the reactor as a whole will be close to the temperature at the cooling side of the reactor tube. This is because the reaction only takes place locally, i.e. at the reaction front. Especially in the centre of the reaction front the temperature will be very high.

Step (i) most preferably is performed as follows. An inert gas flows through the reactor tube, whereby the inert gas may have an elevated temperature. At the same time, the reactor tube is cooled from the outside, for example by means of water around the reactor tube. Then an oxygen comprising gas is passed through the reactor tube, whereby the oxygen concentration and/or the gas temperature at the inlet of the reactor (tube) and/or the space velocity of the gas may be adjusted during the process, and the reactor tube is cooled from the outside.

According to a further aspect of the present invention, the process of the current invention is preceded by a step in which Fischer Tropsch synthesis product is removed from the fixed bed of catalyst particles. This may be performed by washing the fixed bed with a hydrocarbon that is lighter than the Fischer Tropsch synthesis product. For example, Fischer Tropsch wax may be removed by washing with gas oil; the gas oil may be petroleum gas oil, or preferably, a synthetic gas oil, for example a gas oil produced using Fischer Tropsch synthesis. After this removal step, the reactor tube preferably comprises less than 30 grams hydrocarbons per 100 grams catalyst particles, more preferably less than 10 grams hydrocarbons per 100 grams catalyst particles, most preferably less than 5 grams hydrocarbons per 100 grams catalyst particles.

According to a further aspect of the present invention, the process of the current invention is preceded by a step in which the fixed bed of catalyst particles is subjected to a hydrogen comprising gas typically at temperatures of about 200 to 350° C.

The process of the current invention may be preceded by subjecting the fixed catalyst bed to washing with gas oil and/or subjecting it to a hydrogen containing gas before performing step (i).

The catalyst particles in the reactor tube comprise at least 40 weight % of a metal oxide chosen from the group of titania, silica, alumina, zirconia, ceria, gallia and mixtures thereof,
and at least 2 weight % of the element cobalt, calculated on the total weight of the catalyst particles.

Preferably the catalyst particles comprise at least 40 weight % of a metal oxide chosen from the group of titania, silica, alumina, zirconia, ceria, gallia and mixtures thereof, more preferably at least 40 weight % of a metal oxide chosen from the group of titania, silica, alumina, zirconia, and mixtures thereof,
and at least 3 weight % of the element cobalt, more preferably at least 4 weight % of the element cobalt, calculated on the total weight of the catalyst particles, and optionally ruthenium.

More preferably the catalyst particles comprise at least 40 weight % and up to 97 weight % of a metal oxide chosen from the group of titania, silica, alumina, zirconia, ceria, gallia and mixtures thereof, even more preferably at least 40 weight % and up to 97 weight % of a metal oxide chosen from the group of titania, silica, alumina, zirconia, and mixtures thereof,
and at least 3 weight % up to 35 weight % of the element cobalt, calculated on the total weight of the catalyst particles, and optionally ruthenium.

The catalyst particles preferably have been prepared by means of co-extrusion of
a metal oxide chosen from the group of titania, silica, alumina, zirconia, ceria, gallia and mixtures thereof and
cobalt and optionally ruthenium,
followed by drying and/or calcination of the extrudates.

Preferably the catalyst that is subject to step (i) is in a pyrophoric state. In the fixed bed of catalyst particles to which the oxygen comprising gas is fed in step (i) at most 10 mole %, preferably at most 5 mole %, more preferably at most 1 mole %, even more preferably at most 0.1 mole %, of the element cobalt is present in $Co_3O_4$ and/or CoO, calculated on the total amount of moles of cobalt in the catalyst particles. In the fixed bed of catalyst particles to which the oxygen comprising gas is fed in step (i), preferably at least 10 mole %, more preferably at least 20 mole %, even more preferably at least 30 mole %, of the element cobalt is present as metallic cobalt and/or is present in cobalt carbide, calculated on the total amount of moles of cobalt in the catalyst particles.

A Fischer Tropsch catalyst or catalyst precursor comprises a catalytically active metal or precursor therefor, and optionally promoters, supported on a catalyst carrier. The catalyst carrier in this case comprises metal oxide, preferably porous metal oxide. The catalyst carrier comprises a metal oxide chosen from the group of titania, silica, alumina, zirconia, ceria, gallia and mixtures thereof.

Most preferably more than 70 weight percent of the carrier material consists of titania, silica, alumina, and/or zirconia, more preferably more than 80 weight percent, most preferably more than 90 weight percent, calculated on the total weight of the carrier material.

As an example of a suitable carrier material can be mentioned the commercially available Titanium Dioxide P25 ex Evonik Industries.

The carrier preferably comprises less than 40 wt % rutile, more preferably less than 30 wt %, even more preferably less than 20 wt %.

The catalytically active metal in the catalyst is cobalt. Cobalt may be added to the metal oxide carrier in the form of, for example, cobalt hydroxide, CoOOH, cobalt oxide, a co-precipitate of cobalt and manganese hydroxide, a cobalt nitrite, or a cobalt ammonium complex, for example cobalt ammonium carbonate. The catalyst may also include one or more further components, such as promoters and/or co-catalysts.

Suitable co-catalysts include one or more metals such as iron, nickel, or one or more noble metals from Group 8-10 of the Periodic Table of Elements. Preferred noble metals are platinum, palladium, rhodium, ruthenium, iridium and osmium. Such co-catalysts are usually present in small amounts.

References to "Groups" and the Periodic Table as used herein relate to the new IUPAC version of the Periodic Table of Elements such as that described in the $87^{th}$ Edition of the Handbook of Chemistry and Physics (CRC Press).

Typically, the amount of catalytically active metal present in the catalyst may range from 1 to 100 parts by weight per 100 parts by weight of carrier material, preferably from 3 to 50 parts by weight per 100 parts by weight of carrier material.

The catalyst may further comprise one or more promoters. One or more metals or metal oxides may be present as promoters, more particularly one or more d-metals or d-metal oxides. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters. Suitable metal promoters may be selected from Groups 7-10 of the Periodic Table of Elements.

Manganese, iron, rhenium and Group 8-10 noble metals are particularly suitable as promoters, and are preferably provided in the form of a salt or hydroxide.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

One particularly preferred Fischer Tropsch catalyst comprises a manganese or vanadium promoter.

When fresh prepared, the catalyst is shaped or formed, for example by means of pelletizing, (wheel) pressing, or extrusion. The catalytically active metal and/or any promoter may have been added to the carrier material before or after shaping. For example, a cobalt compound, preferably cobalt hydroxide, CoOOH, cobalt oxide, or a co-precipitate of cobalt and manganese hydroxide, may be mixed with metal oxide, followed by extrusion. Or, metal oxide may be extruded, and in a later step the extrudates may be impregnated with a cobalt compound, preferably with a cobalt salt that is soluble in water and/or ethanol.

For optimal shaping, it may be advantageous to add a binder material, for example to increase the mechanical strength of the catalyst or catalyst precursor. Additionally or alternatively, a liquid may be added to the carrier material before or during its shaping. The liquid may be any of suitable liquids known in the art, for example: water; ammonia, alcohols, such as methanol, ethanol and propanol; ketones, such as acetone; aldehydes, such as propanol and aromatic solvents, such as toluene, and mixtures of the aforesaid liquids. A most convenient and preferred liquid is water. The liquid may include viscosity improvers such as a polyvinylalcohol.

In case of extrusion, one may want to improve the flow properties of the carrier material. In that case it is preferred to include one or more flow improving agents and/or extrusion aids prior to extrusion. Suitable additives include fatty amines, quaternary ammonium compounds, polyvinyl pyridine, sulphoxonium, sulphonium, phosphonium and iodonium compounds, alkylated aromatic compounds, acyclic mono-carboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, polyols and acetylenic glycols. Preferred additives are sold under the trademarks Nalco and Superfloc.

To obtain strong extrudates, it is preferred to include, prior to extrusion, at least one compound which acts as a peptising agent for the metal oxide. Suitable peptising agents are well known in the art and include basic and acidic compounds. Examples of basic compounds are ammonia, ammonia-releasing compounds, ammonium compounds or organic amines. In case of a calcination step after shaping, such basic compounds are removed upon calcination and are not retained in the extrudates. This is advisable as such basic compounds may impair the catalytic performance of the final product. Preferred basic compounds are organic amines or ammonium compounds. A most suitable organic amine is ethanol amine. Suitable acidic peptising agents include weak acids, for example formic acid, acetic acid, citric acid, oxalic acid, and propionic acid.

Optionally, burn-out materials may be included prior to extrusion, in order to create macropores in the resulting extrudates. Suitable burn-out materials are commonly known in the art.

The total amount of flow-improving agents/extrusion aids, peptising agents, and burn-out materials in the carrier material to be extruded preferably is in the range of from 0.1 to 20% by weight, more preferably from 0.5 to 10% by weight, on the basis of the total weight of the mixture.

After shaping, the carrier material, optionally including further components, may be strengthened by calcination thereof in a manner known in the art. The metal oxide, especially titania, is preferably calcined at a temperature between 350 and 700° C., more preferably between 400 and 650° C., more preferably between 450 and 600° C. A calcination step is nevertheless optional when preparing a Fischer Tropsch catalyst comprising metal oxide and cobalt.

Activation of a fresh prepared catalyst can be carried out in any known manner and under conventional conditions. For example, the catalyst may be activated by contacting it with hydrogen or a hydrogen-containing gas, typically at temperatures of about 200° to 350° C.

The catalyst that is subjected to the process of the current invention may be deactivated by use in a Fischer Tropsch process.

The Fischer Tropsch process is well known to those skilled in the art and involves synthesis of hydrocarbons from syngas, by contacting the syngas at reaction conditions with the Fischer Tropsch catalyst.

The synthesis gas can be provided by any suitable means, process or arrangement. This includes partial oxidation and/or reforming of a hydrocarbonaceous feedstock as is known in the art. To adjust the $H_2/CO$ ratio in the syngas, carbon dioxide and/or steam may be introduced into the partial oxidation process. The $H_2/CO$ ratio of the syngas is suitably between 1.5 and 2.3, preferably between 1.6 and 2.0.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 175 to 275° C., most preferably 200 to 260° C. Typical total pressures for the catalytic conversion process are in the range of from 5 to 150 bar absolute, more preferably from 5 to 80 bar absolute. In the catalytic conversion process mainly C5+ hydrocarbons are formed.

A suitable regime for carrying out the Fischer Tropsch process with a catalyst comprising particles with a size of least 1 mm is a fixed bed regime, especially a trickle flow regime. A very suitable reactor is a multitubular fixed bed reactor.

EXAMPLES

Fixed beds of cobalt/titana catalysts were unloaded from several reactor tubes. For some the normal unloading method was used. For others the method of the present invention was used, whereby in step (ii) the normal unloading method was used.

The catalyst particles in all fixed beds comprised more than 70 wt % of titania, and about 20 wt % of the element cobalt, calculated on the total weight of the catalyst particles.

The catalyst particles had a size larger than 1 mm.

Procedure for Examples According to the Invention

Before step (i) the catalyst comprised less than 0.1 mole % of the element cobalt in Co3O4 and/or CoO, and more than 30 mole % of the element cobalt present as metallic cobalt and present in cobalt carbide, calculated on the total amount of moles of cobalt in the catalyst particles.

During step (i) a gas comprising 21% oxygen and having a temperature in the range of 20-30° C. was fed to the reactor with a GHSV of 6 Nl/l/hr. The cooling temperature of the water around the catalyst tubes was about 150° C. The total pressure in the reactor tube during step (i) was about 1.7 bar absolute.

In step (ii) the normal unloading method was used to remove the catalyst particles from the reactor tube.

Results

The fixed beds that were unloaded using a method according to the present invention were removed more quickly from the reactor tubes as compared to the fixed beds that were unloaded according to the normal unloading method. An improvement of 8 days was achieved.

That which is claimed is:

1. A process for facilitating the unloading of a fixed bed of catalyst particles from a reactor tube, the catalyst particles comprising:
    at least 40 weight % of a metal oxide chosen from the group of titania, silica, alumina, zirconia, ceria, gallia and mixtures thereof, and
    at least 2 weight % of the element cobalt, calculated on the total weight of the catalyst particles;
  the process comprising the steps of:
    (i) feeding a gas comprising 10 to 30 (vol/vol) percent of oxygen, to the reactor tube with a gas hourly space velocity for oxygen of 0.5 to 50 Nl/l/hr; and
    (ii) removing the catalyst particles from the reactor tube;

wherein in the fixed bed of catalyst particles to which the oxygen comprising gas is fed in step (i) at most 10 mole % of the element cobalt is present in Co3O4 and/or CoO, calculated on the total amount of moles of cobalt in the catalyst particles.

2. The process as claimed in of claim 1, wherein in step (i) the oxygen comprising gas is air.

3. The process of claim 1, wherein the total pressure in the reactor tube during step (i) is in the range of 1 to 10 bar absolute.

4. The process of claim 1, wherein the gas hourly space velocity of oxygen is 1 to 20 Nl/l/hr.

5. The process of claim 1, wherein the fixed catalyst bed is subjected to washing with gas oil and/or subjected to a hydrogen containing gas before performing step (i).

6. The process of claim 1, wherein the reactor tube comprises steel, carbon steel and/or stainless steel.

7. The process of claim 1, wherein step (i) is performed while cooling the reactor tube from the outside, and wherein the temperature of the reactor tube at the cooling side is in the range of between 50 and 400° C.

8. The process of claim 1, wherein step (i) is performed while the oxygen comprising gas fed to the reactor has a temperature in the range of between 0 and 300° C.

9. The process of claim 1, wherein step (i) is performed in a once through operation.

10. The process of claim 1, wherein step (i) is performed by feeding the oxygen comprising gas from the top to the bottom of the reactor tube, or from the bottom to the top of the reactor tube.

11. The process of claim 1, wherein the catalyst particles comprise at least 40 weight % of titania, silica, alumina, zirconia or mixtures thereof, and at least 3 weight % of the element cobalt, calculated on the total weight of the catalyst particles, and optionally ruthenium.

12. The process according to claim 11, wherein the catalyst particles comprise at least 40 weight % and up to 97 weight % of titania, silica, alumina, zirconia or mixtures thereof, and at least 3 weight % up to 35 weight % of the element cobalt, calculated on the total weight of the catalyst particles, and optionally ruthenium.

13. The process of claim 11, wherein the catalyst particles have been prepared by means of co-extrusion of
a metal oxide chosen from the group of titania, silica, alumina, zirconia, ceria, gallia and mixtures thereof and -cobalt and optionally ruthenium, followed by drying and/or calcination of the extrudates.

14. The process of claim 1, wherein the catalyst particles are Fischer Tropsch catalyst particles.

15. The process of claim 1, wherein in the fixed bed of catalyst particles to which the oxygen comprising gas is fed in step (i), at least 10 mole %, of the element cobalt is present as metallic cobalt and/or is present in cobalt carbide, calculated on the total amount of moles of cobalt in the catalyst particles.

* * * * *